Jan. 3, 1967 W. R. ATTWOOD 3,295,873
FASTENER ELEMENTS
Filed May 20, 1963 2 Sheets-Sheet 1
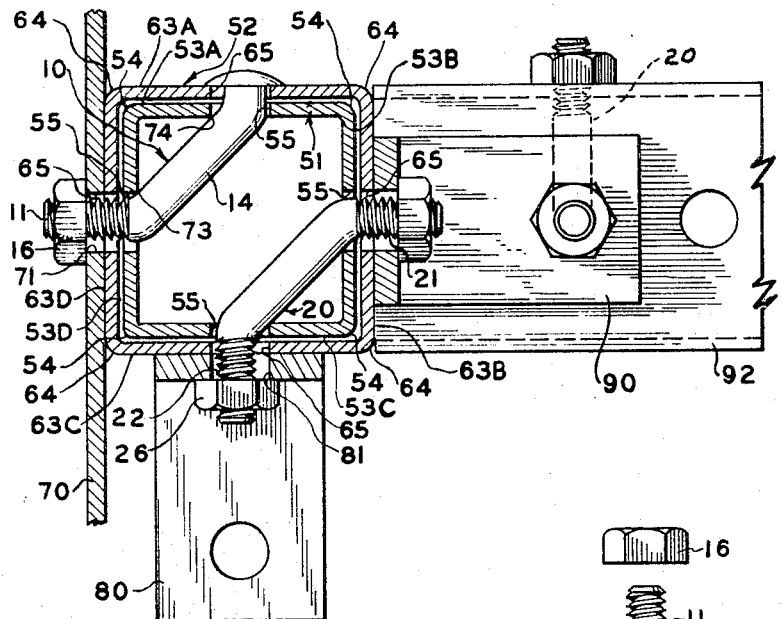
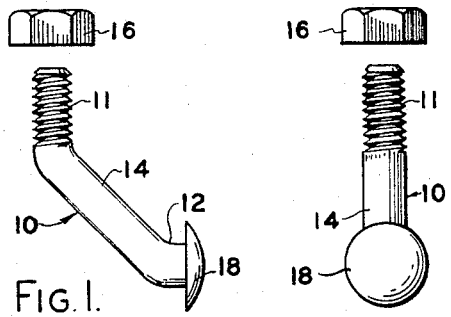
FIG. 9.
FIG. 1.
FIG. 2.
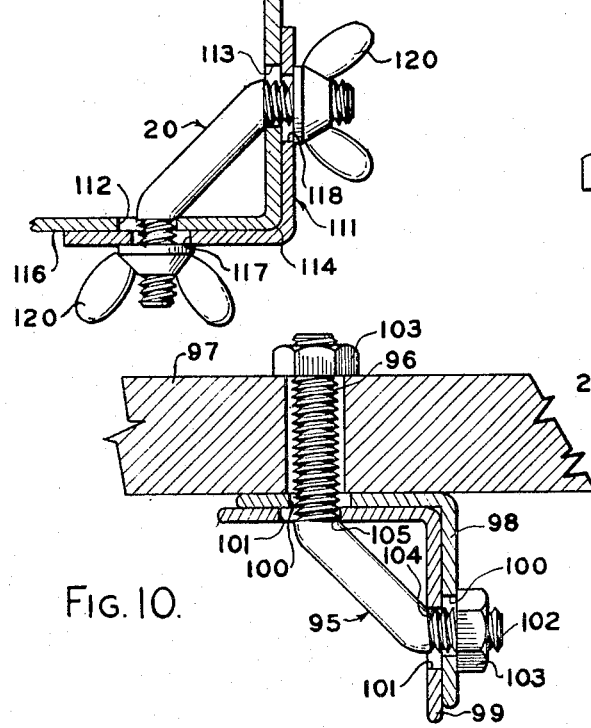
FIG. 11.
FIG. 10.
FIG. 3.
FIG. 4.
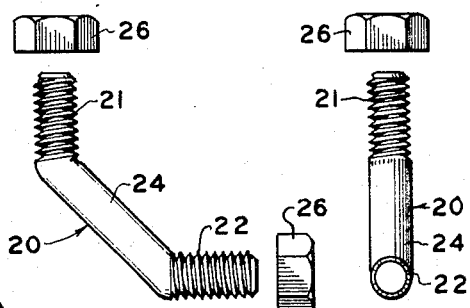
INVENTOR.
WARREN R. ATTWOOD
BY Hauke & Hauke
ATTORNEYS Jan. 3, 1967   W. R. ATTWOOD   3,295,873
FASTENER ELEMENTS
Filed May 20, 1963   2 Sheets-Sheet 2
FIG. 5   FIG. 6.   FIG. 7.   FIG. 8.
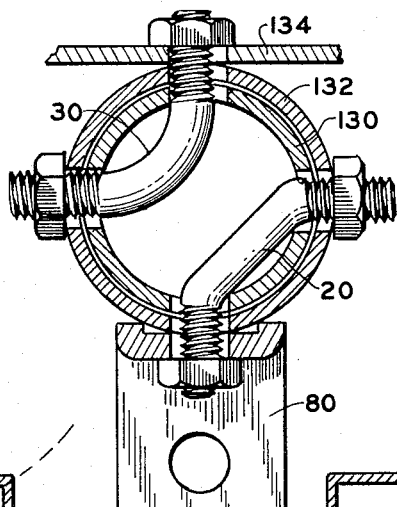
FIG. 14.
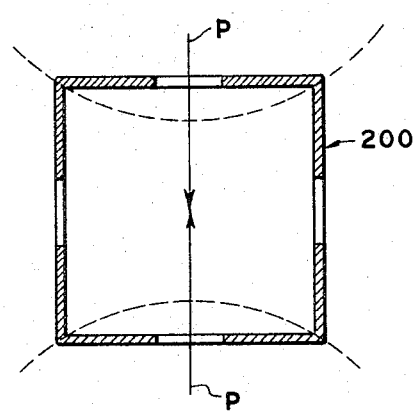
FIG. 12.
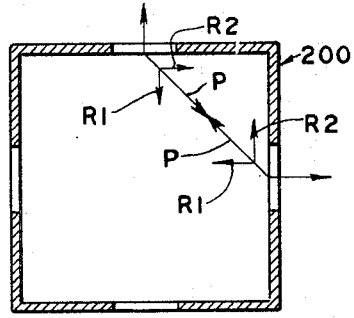
FIG. 13.
*INVENTOR.*
WARREN R. ATTWOOD
BY
*Hauke + Hauke*
ATTORNEYS

United States Patent Office 3,295,873
Patented Jan. 3, 1967

3,295,873
FASTENER ELEMENTS
Warren R. Attwood, 4077 Second St.,
Wayne, Mich. 48184
Filed May 20, 1963, Ser. No. 281,618
15 Claims. (Cl. 287—189.36)

The present invention relates to structural assemblies and more particularly to a new load and stress transmitting fastener element for securing structural members such as plates, angles, channels, panels, and the like to perforated tubing members or for securing one perforated tubing member to another.

Heretofore bolts or other fastening elements extending through opposite sides of tubular structural member have been the most commonly used method for securing fixtures and the like to the tubular member or for securing one tubular member to another. This fastening method produces several important disadvantages which are overcome by the fastener elements of the present invention. Tubular structural members of a rectangular or square cross-section provide the greatest resistance to lateral stresses in the area adjacent the corner edges and provide the least resistance to such stresses on the faces of the member intermediate the edges. When bolts are provided which extend through opposite faces of the tubular member, tightening the bolt concentrates lateral forces in the weakest area of the tubular member often resulting in a crushing or collapsing of the sides of the member. Also, when a through bolt technique is used to fasten structural members to a tubular member the shank of the bolt prevents the fastening of other structural elements to the other two sides of the tubular member through perforations in the same plane as those being used.

The present invention provides a fastener element in which structural members may be fastened to all sides of a tubular member through perforations in a common plane. Further, the diagonally extending fastener element of the present invention reduces the crushing action inherent in through bolt fastening methods by mechanically vectoring a portion of the load, produced by tightening the fastening element, to the corner of the tube.

It is an object of the present invention therefore to increase the versatility of tubular structural members by providing a fastener element permitting structural members to be fastened on all sides of the tubular member through perforations in a common plane.

It is another object of the present invention to increase the strength of structural assemblies utilizing perforated tubular structural members by providing fastening elements having means mechanically vectoring a portion of the load to the corner of the tubular member.

It is still another object of the present invention to increase the strength of structural assemblies comprising one angled or tubular structural member secured in a corner to corner relationship with another angled or tubular structural member by providing a fastener element having means mechanically vectoring a portion of the load to the corners of the structural members to wedge the corner of one structural member into the corner of the other structural member.

Still further objects and advantages of the present invention will readily occur to one skilled in the art to which the invention pertains upon reference to the following drawings in which like reference characters refer to like parts throughout the several views and in which, FIG. 1 is an elevational side view of one preferred fastening element of the present invention.

FIG. 2 is an elevational end view of the fastening element shown in FIG. 1.

FIG. 3 is an elevational side view of another preferred fastening element of the present invention.

FIG. 4 is an elevational end view of the fastening element shown in FIG. 3.

FIG. 5 is an elevational side view of yet another preferred fastening element of the present invention.

FIG. 6 is an elevational end view of the fastening element shown in FIG. 5.

FIG. 7 is an elevational side view of still another preferred fastening element of the present invention.

FIG. 8 is an elevational end view of the fastening element shown in FIG. 7.

FIG. 9 is a cross sectional view of a preferred structural assembly of the present invention.

FIG. 10 is a cross sectional view of another structural assembly of the present invention.

FIG. 11 is a cross sectional view of yet another structural assembly of the present invention.

FIG. 12 is a diagrammatic illustration of the crushing effect produced by through bolting techniques.

FIG. 13 is a diagrammatic illustration of the vectoring of forces produced by the fastener elements of the present invention, and FIG. 14 is a cross sectional view of still another structural assembly of the present invention.

Now referring to the drawings for a more detailed description of the present invention, a preferred fastening element 10 is shown in FIGS. 1–2 as comprising end portions 11 and 12 having their axes substantially normal and connected by a substantially straight intermediate portion 14. The end portion 11 is threaded as shown to receive a nut 16 and the end portion 12 is provided with an enlarged head 18.

FIGS. 3 and 4 illustrate another preferred fastening element 20 as comprising end portions 21 and 22 having their axes substantially normal to each other and connected by a substantially straight intermediate portion 24. Each of the end portions 21–22 is threaded as shown to receive nuts 26.

FIGS. 5–6 illustrate another preferred fastener element 30 similar to the element 20 shown in FIGS. 3–4 except that an intermediate portion 34 is uniformly curved as shown. The intermediate portion 34 connects threaded end portions 31–32 and nuts 36 are provided to be carried on the end portions 31–32.

FIGS. 7–8 illustrate yet another preferred fastener element 40 of the present invention similar to the element 30 shown in FIGS. 5–6 except that an end portion 42 is provided with an enlarged head 48. A uniformly curved intermediate portion 44 connects the end portion 42 with a threaded end portion 41. A nut 46 is provided for the end portion 41.

FIG. 9 illustrates one preferred structural assembly of the present invention as comprising a tubular structural member 51 telescoped into a tubular structural member 52. The tubular members 51–52 are illustrated as being substantially square in lateral cross section although it will be apparent as the description proceeds that other configurations of these members are within the intended scope of the present invention.

The tubular member 51 preferably comprises longitudinally extending flat surfaces 53A, 53B, 53C, 53D, which are connected in pairs at substantially right angles to form corner edges 54. A plurality of equally, longitudinally spaced perforations 55 is provided on each of the surfaces 53A–53D at points preferably equally spaced from the corner edges 54. The perforations 55 are spaced such that a plane substantially normal to the surfaces 53A–53B will intersect the centers of perforations 55 provided on each of the surfaces 53A–53B.

Similarly the tubular member 52 comprises longitudinally extending flat surfaces 63A–63D connected at substantially right angles to form corner edges 64. A plurality of perforations 65 is provided on each of the surfaces 63A–63D. The perforations 65 are spaced such that each one is axially aligned with a corresponding perforation 55 provided in the tubular member 51.

The tubular members 51–52 are locked together by a pair of fastener elements 10 and 20 although it is apparent that the fastener elements 30 and 40 could also be used. The fastener element 10 is inserted through aligned perforations 55 and 65 provided in surfaces 53A–63A of the tubular members 51–52 respectively. The threaded end portion 11 is inserted through aligned perforations 55 and 65 on the surfaces 53D and 63D of the tubular members 51–52 respectively, so that the intermediate portions 14 of the fastener element 10 extends in a position substantially parallel to a diagonal of the lateral cross sectional square formed by the tubular members 51–52.

A panel 70 is provided with a perforation 71 which is aligned with the perforations 55 and 65 as shown and the threaded end portion 11 is sufficiently long to be inserted through the perforation 71. Tightening the nut 16 clamps the panel 70 to the surface 63D of the tubular member 52 and produces a camming action at points 73 and 74 which will be described in greater detail below to securely lock the tubular member 51 to the tubular member 52.

It will be noted that unlike through bolting techniques the fastener element of the present invention permits other structural members to be secured to the tubular member 52 through perforations 65 in a common plane as those used for the fastener element 10.

A fastener element 20 is shown having the end portions 21–22 extending through aligned perforations 55 and 65 provided on the surfaces 53B and 63B and 53C and 63C of the tubular members 51–52. An angled fitting 80 is provided with a perforation 81 through which the end portion 22 is inserted so that tightening the nut 26 clamps the angled fitting 80 to the surface 63C.

A similar angle fitting 90 is similarly clamped to the surface 63B and for purposes of illustrating the versatility of use of the present invention, a tubular member 92 similar in construction to the tubular members 51–52 is shown secured to the angle fitting 90 by the fastener element 20.

FIG. 10 illustrates the use of a fastener element 95 similar in construction to the element shown in FIGS. 3–4 except that a threaded end portion 96 has been extended as shown to accommodate a thick panel 97. Angle members 98–99 are provided with perforations 100–101 respectively which receive the fastener element 95. The shorter end portion 102 of the fastener element 95 is first inserted through the perforations 101 and 100 in that order from the outside of the assembly and then through the perforations 100 and 101 on the opposite side and in that order from the inside of the assembly. The panel 97 is then placed in position. Tightening the nuts 103 securely locks the panel 97 to the angle members 98–99. A camming action is produced at points 104–105 which securely wedges the angle member 99 into the angle member 98.

FIG. 11 illustrates another preferred structural assembly of the present invention as comprising a channel member 110 and an angle member 111. The channel member 110 is preferably provided with perforations 112–113 equally spaced from a corner edge 114 formed by the intersection of substantially normally extending surfaces 115–116. The angle member 111 is provided with perforations 117–118 which register with but are slightly offset from the perforations 112–113 respectively. A fastener element 20 is inserted through the perforations 112, 113, 117, and 118 and wing nuts 120 securely lock the angle member 111 to the channel member 110.

FIG. 14 illustrates yet another preferred structural assembly of the present invention as comprising a round tube member 130 telescoped into another round tube member 132. The tube members 130 and 132 are locked into position by a pair of fastener elements 20 and 30 of the present invention. For purposes of illustration a panel 134 is shown as being secured to the tubes 130 and 132 by the fastener element 30 and an angular fitting 80 is shown as being secured to the tubes 130 and 132 by the fastener element 20.

FIG. 13 illustrates diagrammatically the forces produced by the fastener elements of the present invention. When ordinary through bolting techniques are utilized, forces (P) are exerted as indicated by the arrows in FIG. 12, which tend to contribute to the crushing of the sides of the tubular member 200 toward the dotted line position as shown. This crushing action has been considerably reduced utilizing the fastener elements 10 and 20 illustrated in FIGS. 1–4 through the camming action shown diagrammatically in FIG. 13 which mechanically vectors a portion of the crushing load to the corner of the tubular member.

Now referring to FIGS. 12–13, if

P is the tensile loading of the fastener at a certain torque (lbs.)

$R_1$ is the vector component (lbs.) tending to crush the sides of the tubular member.

$R_2$ is the vector component force (lbs.) transmitted to the corner edge of the tubular member by the fastener element of the present invention.

The tubular member 200 is square in lateral cross section.

Then it is apparent that $R_1$ equals $R_2$ equals $P/\sqrt{2}$ when a fastener element of the present invention is used. Using a normal through bolting technique $R_1$ is substantially equal to P since there are no vector component forces but instead all the loading forces P are exerted along a single axis tending to crush the sides of the tubular member 200. Hence the crushing load effect has been reduced by the fastener elements of the present invention by approximately $$\frac{P - R_1}{P} \times 100 \text{ (percent of reduction)}$$

or 29.4% since $$\frac{P - R_1}{P} \text{ equals } \frac{P - P/\sqrt{2}}{P} \text{ equals } 1 - 1/\sqrt{2} \text{ equals}$$
$$1 - .076 \text{ equals } .294 \text{ or approximately } 29.4\%$$

As is also apparent from the discussion above with reference to FIG. 13 when the distances from the perforations to the corner edge of the structure member are equal even though a structural member other than a square tube is used (as shown and described in FIGS. 10 and 11) the vector forces produced by the fastener element of the present invention which are transmitted to the corner edge of the structural member ($R_2$) are the same value and these forces coact to effectively wedge the corner edge of one structural member into the corner edge of the other structural member. Since $R_2$ is equal to $P/\sqrt{2}$ or approximately .706P or .706 times bolt tension, if P equals 2000 lbs. then $R_2$ will equal approximately 1415 lbs. Thus wing nuts like those shown in FIG. 11 or other latching means such as cams can be used without weakening the structural assembly.

It is also apparent that the fastener elements of the present invention permits structural members to be secured to all sides of a tubular member through perforations in a common plane since one fastener element will not interfere with another.

Because of the angular relationship of the fastener elements of the present invention with the structural members which prevents the element fror rotating, it is not necessary to hold the fastener while tightening the nuts. The element will remain in position while one or both nuts are removed to permit other structural members or fittings to be secured to the tubular member. The length of one end portion of the fastener elements may be increased to accommodate structural members of increased thickness as shown in FIG. 10.

Although I have described several embodiments of the present invention, it is apparent that many changes and modifications can be made without departing from the spirit of the invention or the scope of the appended claims.

I claim:
1. A fastener member for use in clamping a structural member to a tubular member provided with perforations said perforations each having their axes in substantially a common plane and substantially normal to each other, said fastener element comprising:
   (a) a first and a second end portion extending through aligned perforations in said structural member and in said tubular member,
   (b) an intermediate portion connecting said end portions, said end portions being straight and extending at right angles to each other,
   (c) clamping means carried on said end portions,
   (d) said intermediate portion of said fastener member being straight and being adapted to be contained within a transverse cross-sectional area of the interior of said tubular member lying on one side only of a diagonal plane longitudinally bisecting same.

2. A structural assembly comprising
   (a) a first tubular member being provided with perforations having their axes in a substantially common plane,
   (b) a second tubular member adapted to be telescopically received in said first tubular member,
   (c) said second tubular member being provided with perforations which are disposed to be respectively aligned with said perforations in said first tubular member,
   (d) means fastening said tubular members together and comprising a fastener element extending through a pair of adjacent perforations in each of said tubular members,
   (e) said fastener element comprising a first end portion extending through aligned perforations in said tubular member, a second end portion extending through aligned perforations in said tubular members, an intermediate portion connecting said end portions, said end portions being straight and extending at right angles to each other, and clamping means carried on said end portions.

3. The structural assembly as defined in claim 2 and in which said intermediate portion is straight.

4. The structural assembly as defined in claim 2 and in which the intermediate portion of said fastener element is contained within a transverse cross-sectional area of the interior of said tubular members lying on one side only of a diagonal plane longitudinally bisecting same.

5. The structural assembly as defined in claim 2 and in which one of said end portions is threaded and said clamping means comprises a nut carried on said threaded end portion and an enlarged head provided on the other of said end portions.

6. The structural assembly as defined in claim 2 and in which each of said end portions is threaded and said clamping means comprises nuts carried on said threaded end portions.

7. A structural assembly comprising
   (a) a tubular member being rectangular in cross section to define four planar surfaces,
   (b) said tubular member being provided with perforations in said surfaces with the axis of each of said perforations being coplanar with perforations in each of said other surfaces,
   (c) a structural member having a planar surface and a perforation therein,
   (d) a fastener element extending through adjacent and coplanar perforations in said tubular member and said perforation of said structural member to mount said structural member to said tubular member,
   (e) said fastener element comprising straight end portions, an intermediate portion connecting said end portions to extend normal to each other and clamping means carried on said end portions, and
   (f) the intermediate portion of said fastener element being contained within a transverse cross-sectional area of the interior of said tubular member lying on one side only of a diagonal plane longitudinally bisecting same.

8. A structural assembly comprising
   (a) a tubular member being provided with perforations with the axis of one of said perforations being co-planar with and angularly disposed with respect to the axis of the other of said perforations,
   (b) a structural member having a perforation, and
   (c) a fastener element extending through each of said perforations and comprising
      a first end portion extending through one of said tubular member perforations and said structural member perforation,
      a second end portion extending through the other of said tubular member perforations,
      an intermediate portion extending between and connecting said end portions, and
      clamping means carried on said end portions,
   (d) the intermediate portion of said fastener element disposed within a transverse cross-sectional area of the interior of said tubular member lying on one side only of a diagonal plane longitudinally bisecting same.

9. The structural assembly as defined in claim 8 and in which said tubular member is substantially rectangular in section and said intermediate portion extends substantially parallel to one of the diagonals of said rectangular tubular member.

10. The structural assembly as defined in claim 9 and in which said clamping means comprises,
   (a) a threaded portion being provided on one end of said fastener element and a nut carried by said threaded end portion, and
   (b) an enlarged head portion provided at the other end of said fastener element.

11. The structural assembly defined in claim 9 in which said fastener element further comprises
   (a) substantially straight portions at each end of said fastener element and having their axes substantially normal to each other and,
   (b) said intermediate portion being uniformly curved and connecting said end portions.

12. The structural assembly as defined in claim 9 and in which said fastener element further comprises
   (a) substantially straight portions at each end of said fastener element and having their axes substantially normal to each other, and
   (b) said intermediate portion being substantially straight and connecting said end portions.

13. A structural assembly comprising
   (a) a tubular structural member being substantially rectangular in section to form adjacent normally disposed and longitudinally extending surfaces,
   (b) each of a pair of adjacent surfaces of said tubular member being provided with a perforation,
   (c) said perforations being equally spaced from the corner edge of said adjacent surfaces and the axes of said perforations being disposed in a common plane,
   (d) a structural member having a surface engaging one of said adjacent perforated surfaces of said tubular member and a perforation registering with the perforation provided in said engaging tubular member surface, (e) fastening means extending through each of said perforations and disposed entirely within the area defined by said adjacent perforated surfaces and a diagonal of said tubular member.

14. The structural assembly as defined in claim 13 and in which said fastening means comprises
    (a) substantially straight end portions extending respectively through said perforations,
    (b) one of said end portions being threaded and a nut carried by said threaded end portion,
    (c) the other of said end portions being provided with an enlarged head portion,
    (d) an intermediate portion connecting said end portions and extending substantially parallel to the diagonal of said tubular member whereby as said nut is tightened a portion of the load produced thereby is mechanically vectored to the corner edge of said adjacent perforated surfaces of said tubular member.

15. The structural assembly as defined in claim 13 and in which said fastening means comprises,
    (a) substantially straight threaded end portions extending respectively through said perforations,
    (b) a nut carried on each of said threaded end portions,
    (c) an intermediate portion connecting said end portions and extending substantially parallel to the diagonal of said tubular member whereby as said nuts are tightened a portion of the load produced thereby is mechanically vectored to the corner edge of said adjacent perforated surfaces of said tubular member.

References Cited by the Examiner

UNITED STATES PATENTS

| | | |
|---|---|---|
| 1,489,068 | 4/1924 | Drake. |
| 1,525,214 | 2/1925 | Trout _____ 189—36 |

HARRISON R. MOSELEY, *Primary Examiner.*

A. I. BREIER, *Assistant Examiner.*